United States Patent [19]

Coran et al.

[11] Patent Number: 5,102,945

[45] Date of Patent: * Apr. 7, 1992

[54] RUBBER COMPOSITIONS CONTAINING POLYMERIC ACTIVATORS

[75] Inventors: Aubert Y. Coran, Akron, Ohio; Leonard H. Davis, Buffalo Grove, Ill.

[73] Assignee: Monsanto Company, St. Louis, Mo.

[*] Notice: The portion of the term of this patent subsequent to Dec. 3, 2008 has been disclaimed.

[21] Appl. No.: 612,657

[22] Filed: Nov. 14, 1990

Related U.S. Application Data

[60] Continuation-in-part of Ser. No. 381,227, Jul. 18, 1989, Pat. No. 5,070,146, which is a division of Ser. No. 205,968, Jun. 13, 1988, Pat. No. 4,869,968.

[51] Int. Cl.$^5$ .......................... C08L 7/00; C08L 9/06; C08L 39/08
[52] U.S. Cl. ................................ 524/516; 524/526; 525/192; 525/203
[58] Field of Search ............... 525/192, 203; 524/516, 524/526

[56] References Cited

U.S. PATENT DOCUMENTS

| | | | |
|---|---|---|---|
| 2,893,971 | 7/1959 | Kennedy et al. | 260/45.5 |
| 2,984,644 | 5/1961 | Wheat | 260/45.5 |
| 3,114,409 | 12/1963 | Iknayan et al. | 152/330 |
| 4,960,819 | 10/1990 | Sandstrom et al. | 524/516 |

FOREIGN PATENT DOCUMENTS 818285 8/1959 United Kingdom .

OTHER PUBLICATIONS

V. 6. Epshtein et al.-"Low-Temperature Copolymers..." Soviet Rubber Technol. 18 (9) 13 (1960).
W. W. Rinne et al.-"Effect of 2-Vinylpyridine..." I & E Chem 40 (8) 1437 (1948).

Primary Examiner—Melvyn I. Marquis
Assistant Examiner—R. Dean, Jr.
Attorney, Agent, or Firm—Gordon B. Seward

[57] ABSTRACT

Butadiene polymer rubber compositions containing a polymeric activator have particularly beneficial characteristics. The activator is an interpolymer of 2-vinylpyridine monomer and 1,3-butadiene monomer, optionally with styrene, which interpolymer contains from 20% to 65% by weight of vinylpyridine units, and is mostly insoluble in boiling tetrahydrofuran.

8 Claims, No Drawings

RUBBER COMPOSITIONS CONTAINING POLYMERIC ACTIVATORS

This application is a continuation-in-part of copending application Ser. No. 381,227, filed July 18, 1989, now U.S. Pat. 5,070,146 which in turn is a divisional of application Ser. No. 205,968, filed June 13, 1988, and issued on Sept. 26, 1989, as U.S. Pat. No. 4,869,968.

This invention relates to vulcanizable rubber compounds which contain polymeric activators of vulcanization. The polymeric activators are interpolymers from 2-vinylpyridine monomer and 1,3-butadiene monomer.

BACKGROUND OF THE INVENTION

Interpolymers from vinylpyridine monomers and conjugated diene monomers are known. These interpolymers have been used as oil-resistant rubbers in a variety of applications and, in latex form, as adhesives between textile cords and rubber.

The particular behavior of vinylpyridine interpolymers in the vulcanization process has also been noted, when these interpolymers were combined with other vulcanizable rubber. An increase in modulus, tensile strength and tear strength was noted in rubber vulcanizates containing large (30-70%) proportions of vinylpyridine interpolymers (with low levels of vinylpyridine, e.g. 5-15%) blended with such rubbers as natural rubber, styrene-butadiene rubber and butadieneacrylonitrile rubber.

Terpolymers from butadiene, styrene and a small amount of vinylpyridine have also been shown to have a faster cure rate and a resultant higher modulus than control copolymers from butadiene and styrene alone.

BRIEF SUMMARY OF THE INVENTION

It has now been found that improved rubber compositions can be obtained by incorporating in a butadiene polymer rubber compound, in addition to sulfur, zinc oxide and a vulcanization accelerator, from 0.1 to 2.0 parts by weight, per 100 parts by weight of the butadiene polymer rubber of a polymeric activator which is an interpolymer of 2-vinylpyridine monomer and 1,3-butadiene monomer, optionally, with a minor amount of styrene monomer which interpolymer contains from 20% to 65% by weight of 2-vinylpyridine units and is mostly insoluble in boiling tetrahydrofuran (THF).

The improved rubber compositions of the invention possess increased rates of cure with very little increase in scorch rates, and very little increase in the modulus of the cured compositions. Increased cure rates are very desirable, since faster rates of production of rubber articles can thus be obtained. Molded rubber articles can be removed from the mold at an earlier time without the danger of under cure. While it is always possible to increase the cure rate of a rubber compound (up to a point) by using combinations of accelerators and/or higher levels of accelerators, these changes are often accompanied by unacceptable loss of scorch delay or an unacceptable increase in the modulus of the vulcanized article. By using the compositions of the invention, one can obtain faster curing rubber compounds with a minimal decrease in scorch delay and a minimal increase in the modulus of the finished article. Also, the use of an activator which is mostly insoluble in boiling THF has been found to give maximum improvement in cure rate.

DETAILED DESCRIPTION OF THE INVENTION

Butadiene polymer rubbers useful in the compositions of the invention include butadiene homopolymers and copolymers from 1,3-butadiene and a vinyl aromatic co-monomer, such as styrene or alphamethyl styrene. The butadiene-styrene copolymers preferably contain a minor amount of styrene and a major amount of butadiene; such preferred copolymers are known as SBR copolymers. Butadiene homopolymers include those having predominantly cis-1,4 microstructure, and homopolymers which have substantial contents of trans-1,4 or 1,2 microstructure. The butadiene polymers used in the invention are preferably "elastomeric" materials; that is they conform, when vulcanized, to the definition of an elastomeric or rubbery material found in ASTM D 1566.

The butadiene polymers, in the compositions of the invention, contain sulfur, zinc oxide and a vulcanization accelerator. Sulfur is present in the butadiene polymers as a source of crosslinks; typically, lower amounts of sulfur produce vulcanizates having lower crosslink densities, and a resultant low "state of cure." Very high amounts of sulfur, conversely, produce vulcanizates having high crosslink densities, and a resultant high "state of cure." Extremely high sulfur levels result in "hard rubber" or ebonite. Preferred sulfur levels in the butadiene polymers are from 0.2 to 4 parts by weight per 100 parts by weight of polymer.

Vulcanization accelerators useful in the compositions of the invention include a large number of well-known materials. Typical accelerators are listed in the "Rubber World Bluebook." The choice of which accelerator (or accelerators) to use can depend on a number of factors, and is not critical to the invention. Among usable accelerators are thiazoles, such as 2-mercaptobenzothiazole and benzothiazyl disulfide; benzothiazyl sulfenamides, such as N-cyclohexyl-2-benzothiazyl sulfenamide, N,N-dicyclohexylbenzothiazyl- sulfenamide, N,N-diethylbenzothiazyl sulfenamide, N,N-diisopropylbenzothiazyl sulfenamide, N-oxydiethylenebenzothiazyl sulfenamide, N-isopropylbenzothiazyl sulfenamide and N-t-butylbenzothiazyl sulfenamide; guanidines, such as di-ortho-tolylguanidine and diphenyl guanidine; thioureas, such as thylenethiourea, tetramethylthiourea, N,N'-diethylthiourea and N,N'-dibutylthiourea; thiurams, such as N,N'-dimethyl-N,N'-diphenylthiuram disulfide, dipentamethylenethiuram hexasulfide, tetrabutylthiuram monosulfide, tetraethyl- thiuram disulfide, tetrabutylthiuram disulfide and tetramethylthuiram disulfide; xanthates, such as zinc dibutyl xanthate and dibutyl xanthogen disulfide; and dithiocarbamates, including various salts of di-lower alkyl thiocarbamic acid, such as the zinc, lead, ferric, copper, selenium, sodium, tellurium, potassium, bismuth, dimethylammonium and cyclohexylammonium salts.

The amount of accelerator used will vary widely, depending on the type used and the result desired, as is well known in the art. Preferred levels of accelerator are from 0.2 to 5 parts by weight per 100 parts butadiene polymer.

Zinc oxide, typically used in known vulcanization systems, is present preferably in an amount of 2.5 to 10 parts by weight per 100 parts butadiene polymer.

The activators of the invention, which are essential components of the rubber composition, are interpolymers of 2-vinylpyridine monomer and 1,3-butadiene co-monomer in which the interpolymer contains from 20% to 65%, preferable 30% to 55%, and more preferable 35% to 50%, by weight of 2-vinylpyridine units. The interpolymer activators can be produced by copolymerization of 2-vinylpyridine monomer and 1,3-butadiene monomer in known polymerization reactions, optionally with a minor amount of styrene monomer, preferably no more than 5% by weight. Interpolymers which are mostly insoluble in boiling THF can be produced by polymerizing at a relatively high temperature, or by other means, such as by incorporating small amounts of a crosslinking monomer, such as divinylbenzene, either during or after the polymerization. It was also found that allowing the polymerization to proceed essentially to completion was conducive to the production of THF insoluble polymer. A preferred level of THF insolubility is at least 70%, more preferred is at least 90%.

Preferably, the activator is present in an amount of 0.5 to 2.0 parts by weight per 100 parts butadiene polymer.

The rubber compositions of the invention can also contain other typical compounding ingredients, such as antidegradants, fillers, extender oils, stearic acid and other well-known materials normally used in butadiene polymer rubber compounds.

A more complete understanding of the invention can be obtained by reference to the following examples, in which all parts are by weight and all temperatures are in degrees Celsius, unless otherwise specified.

EXAMPLE 1

Copolymers of 1,3-butadiene with 2-vinylpyridine are prepared by standard emulsion polymerization procedures. Both "hot" and "cold" polymerizations were used, employing a laboratory autoclave.

The following were placed into the autoclave for the typical hot emulsion polymerization: 1.33 grams rubber reserve soap, 0.2 grams potassium chloride, 0.03 grams sodium hydroxide, 52 ml deionized water, 2 drops Dowfax, 0.1 gram tert-dodecylmercaptan, 13.3 grams 2-vinylpyridine and 0.1 gram potassium persulfate. The autoclave was closed up and evacuated. Then 20 grams 1,3-butadiene were transferred into the autoclave. Typically the temperature was ramped up from 50° C. to 85° C. and the length of reaction depended on the decrease in pressure in the autoclave. In polymerizations where divinylbenzene was used, it was added to the 2-vinylpyridine. In these cases the reaction conditions were such that gel would not have been formed in the absence of divinylbenzene. In several cases hydroquinone was used as a shortstop for the reaction.

Before coagulation of the latex, antioxidant mixture comprised of 0.46 grams Polygard, 0.15 grams Irgonox 1076 and 1.2 grams water was added to the latex. Then the latex was added to a boiling solution of 5.38 grams magnesium sulfate in 730 ml water. After the temperature reached 95° C., the coagulated latex was stirred for 10 minutes and then cooled to 85° C. At this point ice was added to the copolymer. The interpolymer was then filtered, washed with cold water, pressed in a hydraulic press and dried by evacuating at 50° C. overnight. This recipe was calculated to produce an interpolymer containing 40% 2-vinylpyridine; variations in monomer charge ratios gave higher and lower levels of 2-vinylpyridine units in the finished interpolymer.

The following were placed into the autoclave for the typical cold emulsion polymerization: 50 ml deionized water, 1.5 grams Dresinate 214 (disproportionated rosin acid soap), and 0.17 grams trisodium phosphate. The mixture was heated until dissolved and cooled to room temperature. The pH of the solution was measured and was typically 10. A mixture of 13.3 grams 2-vinylpyridine and 0.07 grams tertdodecylmercaptan was added to the autoclave. The mixture of 2 ml deionized water, 0.006 grams Versene Fe-3, 0.003 grams ferrous sulfate and 0.027 grams sodium formaldehyde sulfoxylate was then added to the autoclave. Finally, 2 drops pinane hydroperoxide were added to the autoclave. The autoclave was closed up and evacuated. Then 20 grams of 1,3-butadiene were transferred into the autoclave. The reaction was allowed to proceed for 30 hours at $-5°$ C. To ensure that no gel was formed in the cold polymerization attempt, 0.067 grams dimethyldithiocarbamic acid, sodium salt dihydrate, was used as a shortstop before coagulation. The latex was coagulated as in the previous preparation. Subsequent reactions included the use of divinylbenzene to prepare gelled copolymers. Similarly, the proportions of monomers are varied to give higher and lower levels of 2-vinylpyridine units in the interpolymer.

Nitrogen analysis and gel content analysis were carried out for all the copolymers. The nitrogen analysis was used to determine the 2-vinylpyridine content for each copolymer. For the gel content analysis, a 16-hour soxhlet extraction in hot THF was carried out in a Kontes EC thimble.

A series of interpolymers was prepared as above, with relatively low, medium and high levels of 2vinylpyridine units, and with low and high levels of THF insolubles ("gel content"). The following activators were made:

Activator 1 was hot-polymerized (up to 90° C.) for between 5 and 6 hours, using a 28% 2-vinylpyridine monomer charge. Conversion of 97% was realized.

Activator 2 was hot-polymerized, but only for 3 hours, at a reaction temperature of 70° C., using the same monomer charge as in Activator 1. Conversion of 76% was realized.

Activator 3 was hot-polymerized (up to 65° C.) for 3 1/2 hours, with a 40% 2-vinylpyridine charge. Conversion was 77%.

Activator 4 was hot-polymerized in the same manner as Activator 3, except that 5% divinylbenzene was added at the start. Conversion was 83%.

Activator 5 was hot-polymerized (at 85° C.) for 5 hours, using a 55% 2-vinylpyridine charge. Conversion was 81%.

Activator 6 was prepared in the same way as Activator 5, except the reaction proceeded for 6 hours. Conversion was 96%.

Properties of these activators are listed in Table 1.

TABLE 1

| ACTIVATOR | % VP | % GEL |
|---|---|---|
| 1 | 22.9 | 90 |
| 2 | 26.9 | 0 |
| 3 | 37.7 | 0 |
| 4 | 37.1 | 94 |
| 5 | 57.6 | 0 |
| 6 | 52.4 | 75 |

EXAMPLE II

Each of the 2-vinylpyridine copolymers was blended into a carbon black-filled SBR masterbatch at concentrations of 1.0 and 2.0 phr. (The abbreviation "phr" means parts per hundred of rubber, by weight.) Control compositions, each containing no 2-vinylpyridine copolymer were also prepared and evaluated. The recipe for the masterbatch, in parts by weight, was as follows: SBR 1502, 100; N-330 carbon black (HAF), 50; Circosol 4240 naphthenic oil, 5; zinc oxide, 5; stearic acid, 2. The masterbatch was prepared by standard procedures in a Banbury mixer. The curatives, 2-vinylpyridine copolymer activators, and 2.0 phr of N-1,3-dimethylbutyl-N'-phenyl-p-phenylenediamine antidegradant (SANTOFLEX® 13) were added on a roll mill. Tests of the compositions were in accordance with the appropriate ASTM procedures for rubber. In each compound the curing system comprised 2.0 phr sulfur and 1.2 phr N-t-butyl-benzothiazylsulfenamide (SANTOCURE® NS) accelerator. Vulcanization characteristics were determined by using the Mooney viscometer at 135° and the Monsanto Oscillating Disc Rheometer (ORD) at 153°. Mooney scorch, a measure of scorch resistance (resistance to premature vulcanization) was taken as the time required for a 5 point rise from the minimum Mooney viscosity. Other parameters which characterize vulcanization were taken from the ODR cure curves ("rheographs"), which were obtained for vulcanization at 153° C. The parameters Rmn and Rmx are the minimum rheometer torque (before the onset of vulcanization) and the maximum rheometer torque (due to vulcanization), respectively. The parameter t2 is the time required for an increase (over Rmn) in rheometer torque of 2.2 dNm (2.0 in-lb); t25 is time required for the occurrence of 25% of the increase in torque due to vulcanization (time at R/(Rmx−Rmn)=0.25); t90 is the time required for the occurrence of 90% of the increase in torque due to vulcanization (time at R/(Rmx−Rmn)=0.90); and the maximum vulcanization velocity (VMax) is the maximum rate of increase in ODR torque per minute, expressed as a percentage of RmaxRmin, and is given as %/min.

Test data are summarized in Tables II through IV. "B-1 masterbatch" refers to the carbon black filled SBR masterbatch containing all ingredients except the polymeric activators, sulfur, accelerator and antidegradant. In each case, the control stock, which contained no activator, was prepared from the same batch of masterbatch as was the experimental stock and was measured in the same set on the same day as was the experimental stock.

It can be seen that the presence of 0.5–2.0 phr of a 2-vinylpyridine-butadiene copolymer only slightly affects the mechanical properties of black-filled SBR vulcanizates. The effect of the vinylpyridine copolymer activators on the vulcanization characteristics is of primary importance. The parameter VMax indicates the relative rate of vulcanization throughout most of the process after the crosslinking reaction is under way. The parameter t90-t2 is an inverse indication of the overall rate of the crosslinking reaction.

The parameter t25-t2 is an inverse indication of the rate of crosslink formation early in the crosslinking process. It is important since rubber products are frequently removed from the mold before the crosslinking process is complete. Removing an article from the mold as soon as practical (lest there be bubbles, porosity, etc.), prevents tearing of an article during its demolding and it saves expensive molding time. Thus, much of the vulcanization occurs while the article is still hot but removed from the mold.

TABLE II

|  | Control | 1A | 1B | 2A | 2B |
|---|---|---|---|---|---|
| B-1 Masterbatch | 162 | 162 | 162 | 162 | 162 |
| Sulfur | 2.0 | 2.0 | 2.0 | 2.0 | 2.0 |
| Accelerator | 1.2 | 1.2 | 1.2 | 1.2 | 1.2 |
| Activator 1 | — | 1.0 | 2.0 | — | — |
| Activator 2 | — | — | — | 0.1 | 0.2 |
| SANTOFLEX® 13 | 2.0 | 2.0 | 2.0 | 2.0 | 2.0 |
| Mooney scorch 135° C. | | | | | |
| t5, min. | 44.0 | 40.7 | 39.2 | 39.6 | 39.2 |
| Oscil. Disc Rheometer data at 153° C. | | | | | |
| Rmx, Nm | 4.47 | 4.49 | 4.42 | 4.54 | 4.93 |
| Rmn, Nm | 0.68 | 0.68 | 0.68 | 0.67 | 0.68 |
| t90, min. | 17.5 | 14.8 | 14.0 | 15.0 | 13.7 |
| t25, min. | 10.0 | 9.5 | 8.8 | 9.3 | 8.7 |
| t2, min. | 8.3 | 8.2 | 7.7 | 7.8 | 7.2 |
| t90-t2, min. | 9.2 | 6.6 | 6.3 | 7.2 | 6.5 |
| t25-t2, min. | 1.7 | 1.3 | 1.1 | 1.5 | 1.5 |
| VMax, %/min. | 18.5 | 23.4 | 25.9 | 20.9 | 24.6 |
| Stress-strain data, cured at 153° to Rmx (unaged) | | | | | |
| Shore A hardness | 66 | 68 | 67 | 68 | 68 |
| Stress at 300% strain, MPa | 17.9 | 18.1 | 17.7 | 18.1 | 17.5 |
| Ult. ten. strength, MPa | 25.0 | 24.7 | 25.6 | 25.0 | 25.3 |
| Ult. elongation, % | 399 | 395 | 410 | 403 | 413 |
| Goodrich Flexometer data 0.445 cm stroke, 1.21 MPa load | | | | | |
| Perm. set, % | 7.8 | 8.7 | 8.9 | 7.9 | 9.2 |
| Temp. rise ° C. | 33 | 31 | 36 | 31 | 36 |
| Tear Strength, Die C | | | | | |
| At room temp, lbf/in. | 214 | 222 | 228 | 222 | 224 |
| At 100°, lbf/in. | 93 | 103 | 105 | 106 | 104 |

TABLE III

|  | Control | 3A | 3B | 4A | 4B |
|---|---|---|---|---|---|
| B-1 Masterbatch | 162 | 162 | 162 | 162 | 162 |
| Sulfur | 2.0 | 2.0 | 2.0 | 2.0 | 2.0 |
| Accelerator | 1.2 | 1.2 | 1.2 | 1.2 | 1.2 |
| Activator 3 | — | 1.0 | 2.0 | — | — |
| Activator 4 | — | — | — | 0.1 | 0.2 |
| SANTOFLEX® 13 | 2.0 | 2.0 | 2.0 | 2.0 | 2.0 |
| Mooney scorch 135° C. | | | | | |
| t5, min. | 43.7 | 40.0 | 36.7 | 38.0 | 35.7 |
| Oscil. Disc Rheometer data at 153° C. | | | | | |
| Rmx, Nm | 4.68 | 4.68 | 4.55 | 4.58 | 4.50 |
| Rmn, Nm | 0.71 | 0.72 | 0.71 | 0.72 | 0.73 |
| t90, min. | 17.3 | 14.5 | 13.5 | 13.5 | 12.8 |
| t25, min. | 9.8 | 9.0 | 8.5 | 8.7 | 8.3 |
| t2, min. | 8.0 | 7.3 | 7.2 | 7.5 | 7.3 |
| t90-t2, min. | 9.3 | 7.2 | 6.3 | 6.0 | 5.5 |
| t25-t2, min. | 1.8 | 1.7 | 1.3 | 1.2 | 1.2 |
| VMax, %/min. | 18.7 | 22.4 | 25.5 | 27.2 | 31.1 |
| Stress-strain data, cured at 153° to Rmx (unaged) | | | | | |
| Shore A hardness | 66 | 68 | 70 | 66 | 68 |
| Stress at 300% strain, MPa | 18.8 | 18.1 | 17.0 | 17.8 | 16.9 |
| Ult. ten. strength, MPa | 24.7 | 24.6 | 25.1 | 24.9 | 23.4 |
| Ult. elongation, % | 374 | 387 | 412 | 389 | 389 |
| Goodrich Flexometer data | | | | | |

TABLE III-continued

|  | Control | 3A | 3B | 4A | 4B |
|---|---|---|---|---|---|
| 0.445 cm stroke, 1.21 MPa load | | | | | |
| Perm. set, % | 5.4 | 6.9 | 8.9 | 6.9 | 8.3 |
| Temp. rise ° C. | 26 | 34 | 40 | 28 | 30 |
| Tear Strength, Die C | | | | | |
| At room temp, lbf/in. | 217 | 230 | 219 | 225 | 232 |
| At 100°, lbf/in. | 108 | 112 | 133 | 113 | 116 |

TABLE IV

|  | Control | 5A | 5B | 6A | 6B |
|---|---|---|---|---|---|
| B-1 Masterbatch | 162 | 162 | 162 | 162 | 162 |
| Sulfur | 2.0 | 2.0 | 2.0 | 2.0 | 2.0 |
| Accelerator | 1.2 | 1.2 | 1.2 | 1.2 | 1.2 |
| Activator 5 | — | 1.0 | 2.0 | — | — |
| Activator 6 | — | — | — | 0.1 | 0.2 |
| SANTOFLEX ® 13 | 2.0 | 2.0 | 2.0 | 2.0 | 2.0 |
| Mooney scorch 135° C. | | | | | |
| t5, min. | 43.5 | 37.0 | 32.5 | 35.3 | 30.0 |
| Oscil. Disc Rheometer data at 153° C. | | | | | |
| Rmx, Nm | 4.49 | 4.47 | 4.29 | 4.45 | 4.31 |
| Rmn, Nm | 0.69 | 0.66 | 0.67 | 0.66 | 0.66 |
| t90, min. | 17.7 | 13.7 | 12.5 | 13.2 | 12.3 |
| t25, min. | 10.2 | 8.5 | 7.5 | 8.0 | 7.5 |
| t2, min. | 8.5 | 7.2 | 6.3 | 6.8 | 6.5 |
| t90-t2, min. | 9.2 | 6.5 | 6.2 | 6.4 | 5.8 |
| t25-t2, min. | 1.7 | 1.3 | 1.2 | 1.2 | 1.0 |
| VMax, %/min. | 18.5 | 25.3 | 30.4 | 27.2 | 31.8 |
| Stress-strain data, cured at 153° to Rmx (unaged) | | | | | |
| Shore A hardness | 65 | 68 | 67 | 68 | 70 |
| Stress at 300% strain, MPa | 17.6 | 17.4 | 16.1 | 17.2 | 16.2 |
| Ult. ten. strength, MPa | 25.2 | 24.8 | 23.4 | 23.7 | 24.8 |
| Ult. elongation, % | 403 | 404 | 409 | 389 | 431 |
| Goodrich Flexometer data 0.445 cm stroke, 1.21 MPa load | | | | | |
| Perm. set, % | 8.0 | 8.6 | 9.5 | 7.3 | 10.1 |
| Temp. rise ° C. | 29 | 31 | 42 | 36 | 40 |
| Tear Strength, Die C | | | | | |
| At room temp, lbf/in. | 218 | 217 | 232 | 219 | 238 |
| At 100°, lbf/in. | 104 | 106 | 122 | 102 | 121 |

The effects of the activators on cure rate are greater at higher levels of loading or usage. Substantial effects are obtained at all levels of loading shown in the data. Higher levels are less appropriate for some applications since experience has shown that higher levels of loading give somewhat hysteretic stocks. Thus, maximum levels of usage of the activators is limited to 2.0 phr.

A review of the rheometer data in Tables II-IV shows that, in each instance, the activator containing predominately THF insoluble interpolymer has a substantially greater effect on the rate of cure (as measured by each of the derived properties) as compared with the THF soluble interpolymer. Thus, the desired improvement in vulcanization rate can be accomplished with a smaller amount of the activator, when a THF insoluble interpolymer is used, and the negative effects of the interpolymer upon the physical properties of the vulcanizate (relating to hysteresis) can be minimized.

This phenomenon is shown to be true for low, medium and high levels of vinylpyridine content in the activator, throughout the preferred range.

The results are similar, though not as dramatic for the inverse early cure-rate index, t25-t2.

EXAMPLE III

In order to investigate the contribution of the gelled portion of the activators (insoluble in boiling THF) versus the soluble portion, an interpolymer similar to Activator 4 was separated into soluble and insoluble fractions by extraction in boiling THF. Elemental analysis of the fractions showed an equal content of 2-vinylpyridine units in each. Rubber compounds were prepared and tested as in Example II, and the data are shown in Table V. The soluble fraction is identified as Activator 7, the insoluble fraction as Activator 8.

TABLE V

|  | Control | 7A | 7B | 8A | 8B |
|---|---|---|---|---|---|
| B-1 Masterbatch | 162 | 162 | 162 | 162 | 162 |
| Sulfur | 2.0 | 2.0 | 2.0 | 2.0 | 2.0 |
| Accelerator | 1.2 | 1.2 | 1.2 | 1.2 | 1.2 |
| Activator 7 | — | 1.0 | 2.0 | — | — |
| Activator 8 | — | — | — | 0.1 | 0.2 |
| SANTOFLEX ® 13 | 2.0 | 2.0 | 2.0 | 2.0 | 2.0 |
| Mooney scorch 135° C. | | | | | |
| t5, min. | 46.4 | 40.7 | 40.5 | 40.0 | 35.2 |
| Oscil. Disc Rheometer data at 153° C. | | | | | |
| Rmx, Nm | 4.24 | 4.16 | 4.13 | 4.23 | 4.11 |
| Rmn, Nm | 0.62 | 0.64 | 0.65 | 0.66 | 0.67 |
| t90, min. | 18.3 | 14.5 | 13.8 | 13.8 | 12.8 |
| t25, min. | 10.5 | 8.8 | 8.3 | 8.7 | 8.2 |
| t2, min. | 8.7 | 7.5 | 7.0 | 7.3 | 7.0 |
| t90-t2, min. | 9.6 | 7.0 | 6.8 | 6.5 | 5.8 |
| t25-t2, min. | 1.8 | 1.3 | 1.3 | 1.4 | 1.2 |
| VMax, %/min. | 17.2 | 22.2 | 23.1 | 24.8 | 27.9 |
| Stress-strain data, cured at 153° to Rmx (unaged) | | | | | |
| Shore A hardness | 59 | 63 | 61 | 58 | 56 |
| Stress at 300% strain, MPa | 18.0 | 17.8 | 16.5 | 17.7 | 17.0 |
| Ult. ten. strength, MPa | 24.5 | 25.0 | 22.4 | 23.6 | 25.0 |
| Ult. elongation, % | 390 | 406 | 380 | 378 | 414 |

As can be seen from the data in Table V, the comparison between the curing behavior of rubber compounds containing THF insoluble activators and that of compounds containing THF soluble activators shows the same results as before, even when they are different fractions of the same polymerizate.

EXAMPLE IV

When terpolymers from 2-vinylpyridine, 1,3-butadiene and styrene (the latter in an amount of about 3% by weight) are evaluated as activators in the rubber compounds of the invention, similar results are obtained; that is, the terpolymers which are mostly THF insoluble are substantially more effective in improving the cure rate of the rubber compounds than those which are THF soluble.

Interpolymers produced by "cold" polymerization techniques are also effective in the compositions of the invention. The cold polymerizates tend to be low in gel content; however, the use of branching agents such as divinyl benzene is effective in making THF insoluble interpolymers in this system.

The compositions of the invention are useful in making rubber articles of a variety of types, including pneumatic tires.

We claim:

1. A rubber composition comprising a butadiene polymer rubber and 0.2-4 parts by weight of sulfur, 0.2-5 parts by weight of a vulcanization accelerator, 2.5-10 parts by weight of zinc oxide and 0.1-2.0 parts by weight of a cure activator per 100 parts by weight of the rubber, which cure activator is an interpolymer of 2-vinylpyridine monomer and a 1,3-butadiene comonomer, optionally with a minor amount of styrene monomer, in which the interpolymer contains from 30% to 55% by weight of 2-vinylpyridine units, and is at least 70% insoluble in boiling tetrahydrofuran.

2. The composition of claim 1 wherein the rubber is a copolymer from a minor amount of styrene and a major amount of butadiene.

3. The composition of claim 2 wherein the activator is present in an amount of from 0.5 to 2.0 parts by weight per 100 parts by weight of the rubber.

4. The composition of claim 3 wherein the interpolymer is at least 90% insoluble in boiling tetrahydrofuran.

5. The composition of claim 4 wherein the interpolymer contains from 35% to 50% by weight of 2-vinylpyridine units.

6. The composition of claim 1 wherein the rubber is a homopolymer of 1,3-butadiene.

7. The composition of claim 6 wherein the interpolymer contains from 35% to 50% by weight of 2-vinylpyridine units.

8. The composition of claim 7 wherein the interpolymer is at least 90% insoluble in boiling tetrahydrofuran.

* * * * *